April 25, 1967  R. G. ESHLEMAN ETAL  3,315,461

MAINSPRING MONITOR

Filed Dec. 18, 1964  2 Sheets-Sheet 1

INVENTORS.
RALPH G. ESHLEMAN
JOHN O. JAMES

BY  Le Blanc & Shur

ATTORNEYS.

April 25, 1967  R. G. ESHLEMAN ETAL  3,315,461
MAINSPRING MONITOR
Filed Dec. 18, 1964  2 Sheets-Sheet 2
FIG. 6
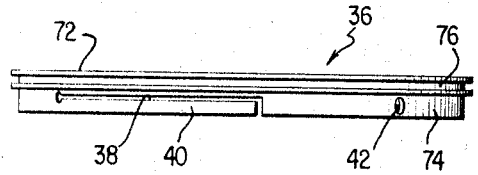
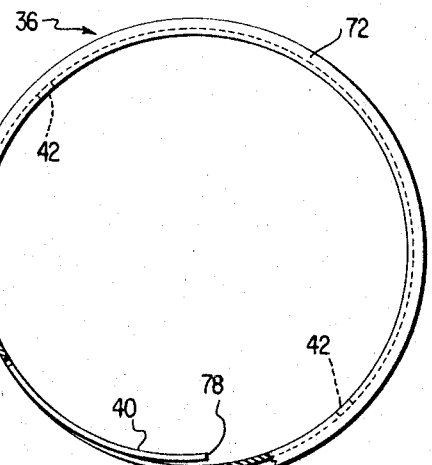
FIG. 7
FIG. 8
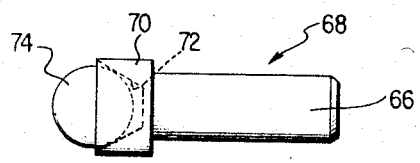
FIG. 9
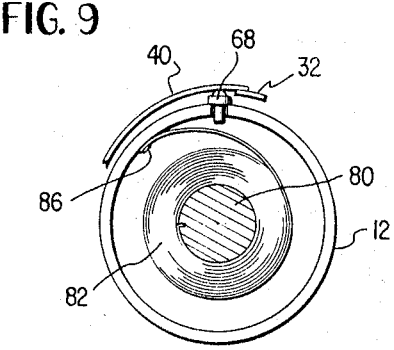
FIG. 10
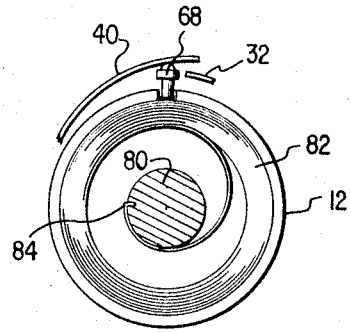
FIG. 11
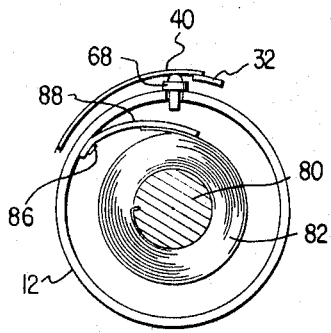
INVENTORS.
RALPH G. ESHLEMAN
JOHN O. JAMES
BY  ATTORNEYS.

United States Patent Office 3,315,461
Patented Apr. 25, 1967

3,315,461
MAINSPRING MONITOR
Ralph G. Eshleman and John O. James, Lancaster, Pa., assignors to Hamilton Watch Company, Lancaster, Pa., a corporation of Pennsylvania
Filed Dec. 18, 1964, Ser. No. 419,324
14 Claims. (Cl. 58—85)

This invention relates to a device for monitoring the condition of a coil spring, and more particularly to an arrangement for determining and indicating the run-down or broken condition of the mainspring in a spring driven timing mechanism.

Devices have been proposed in the past for indicating the run-down condition of a clock mainspring or alarm spring and in some few instances have relied upon the expansion of the spring to initiate or produce the indication. However, these devices have not been suited for use in conjunction with the more recent timepiece constructions wherein the mainspring is completely surrounded by a rotatable mainspring barrel. This is probably due to the fact that, in the prior indicators, expansion of the mainspring produced a generally radial movement of a reciprocatable member directly contacting the outer winding of the spring. The provision of this type of direct contact necessarily limited the prior devices to arrangements where the spring was not completely surrounded by a barrel, since the indicator device or element was positioned directly in the path of movement of such a barrel.

In the use of spring-driven mechanical timers for aerospace applications, it is often desirable to remotely monitor the mainspring barrel to determine that it is (a) fully wound, and (b) not broken. The present invention provides such a device which at the same time does not interfere with the rotational movement of the barrel, the latter normally undergoing at least one complete revolution during the time that the mainspring is unwinding.

In the present invention the outside of the mainspring barrel is surrounded by an insulated ring. About the insulated ring are two metal sliprings insulated from each other, one of the rings having a tab on it which projects into the path of a tab formed on the second ring. An insulated pin projects radially through the barrel and contacts one of the tabs. The pin is located in such a position relative to the mainspring outer terminal point, that as the mainspring uncoils the pin is moved radially outwardly causing the pin to press one of the tabs away from the other, hence breaking the electrical circuit to a suitable indicating device. This circuit comprises a battery or other electrical source coupled to the indicator by way of a pair of wiper arms or pick-up brushes, which engage the electrically conducting sliprings mounted on the outside of the barrel.

It is therefore one object of the present invention to provide a novel mainspring monitor.

Another object of the present invention is to provide a device for indicating the condition of the mainspring of a timer.

Another object of the present invention is to provide a device for determining and indicating the condition of a coiled mainspring in a rotatable barrel.

Another object of the present invention is to provide a mainspring monitor particularly suited for aerospace application.

These and further objects and advantages of the invention will be more apparent upon reference to the following specification, claims, and appended drawings:

FIGURE 6 is an elevational view of the upper slipring of the monitor of FIGURE 1;

FIGURE 7 is a plan view of the slipring of FIGURE 6;

FIGURE 8 is an enlarged view of the mainspring camming pin of FIGURE 1;

FIGURE 9 shows the position of the camming pin when the mainspring is fully wound;

FIGURE 10 shows the position of the camming pin when the mainspring is unwound; and FIGURE 11 shows a modified embodiment for use with lighter mainsprings.

Figure 1:
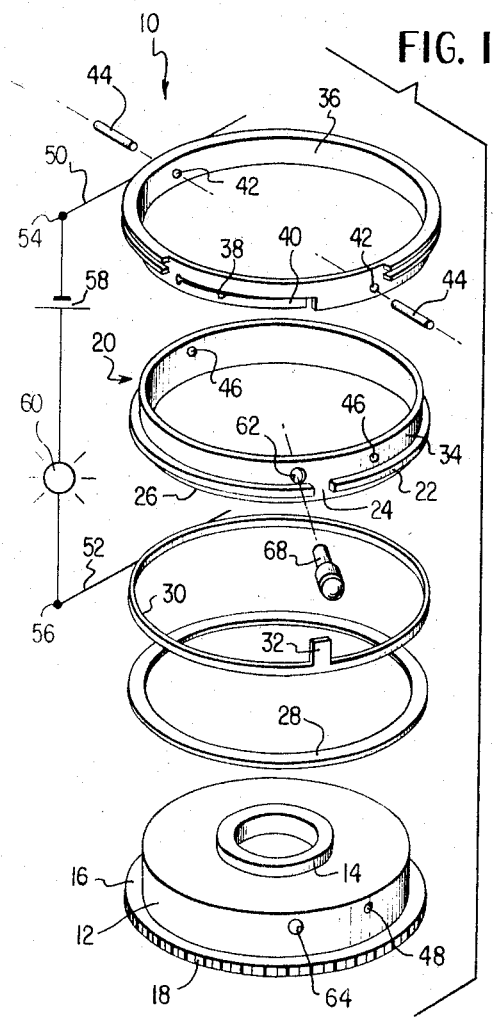
FIGURE 1 is an exploded view showing the various parts of the mainspring monitor of the present invention.

Referring to the drawings and especially to FIGURE 1 showing an exploded view, the mainspring monitor of the present invention generally indicated at 10 comprises a mainspring barrel 12 having an upper flange 14, and a lower flange 16 carrying circumferential gear teeth 18. These teeth conventionally mesh with the first gear of a timer gear train to drive the timer in a well known manner. Passing with a press fit over the barrel 12 is a bushing 20 of insulating material which bushing is provided with an integral radially extending annular ring 22 cut away to provide a slot 24. Received over the lower end 26 of the bushing 20 is a flat insulating ring 28. Also received over the lower end 26 of the bushing is a lower conductive slipring 30 provided with an integral tab 32 received through the slot or notch 24 in the ring 22 of the bushing so as to extend through the notch and to overlie the upper side 34 of the bushing. Insulating ring or washer 28 spaces the lower edge of the slipring 30 from the flange 16 of the barrel.

Received over the upper portion 34 of the bushing 20 is an upper conductive slipring 36, cut-away as in 38 to define an elongated tab 40. Slipring 36 is provided with a pair of apertures 42 spaced 180° about the slipring and which apertures receive a pair of locating pins 44. When the device is assembled these pins also pass through similar apertures 46 in bushing 20 and into holes 48 formed in the outer wall of the barrel 12. A pair of resilient wiper arms or pickup brushes 50 and 52 are provided, one engaging each of the sliprings 30 and 36. The pickups 50 and 52 are coupled to terminals 54 and 56 which are in turn connected through a suitable electrical power supply such as the battery 58 to an indicator illustrated as an incandescent electric light 60.

The upper portion 34 of bushing 20 is provided with an additional aperture 62 aligned with a similar aperture 64 in the barrel, through both of which passes the shank 66 of a cam pin 68 shown in more detail in FIGURE 8. In addition to the shank 66 the pin 68 includes a head 70 which limits the radially inward movement of the pin and which head is provided with a truncated conical recess 72 receiving a glass or sapphire ball 74. The shank and head of the pin are preferably made of stainless steel and the insulating ball 74 is secured in the recess by a suitable epoxy resin.

Referring to FIGURE 6, the upper slipring 36 is provided with a pair of spaced integral annular flanges 72 and 74 which define between them an annular surface or track 76 for the upper wiper arm or brush 50. That is, the resilient nature of the brush causes it to press against the surface 76 and to be restrained against transverse movement by the flanges 72 and 74 so that the slipring 36 may rotate completely through 360° with the brush never contacting the lower portion of the slipring including tab 40. This tab is bent inwardly as indicated at 78 in FIGURE 7, to make sure that when the device is assembled the tab tightly overlies and engages the corresponding tab 32 on the lower slipring 30.

Figure 2:
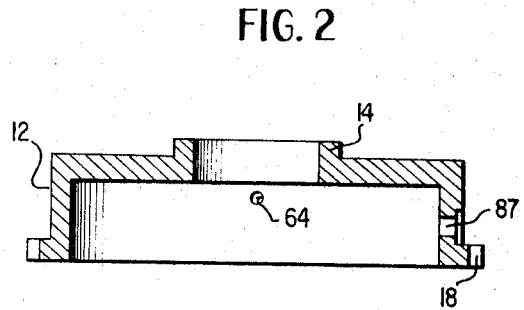
FIGURE 2 is a vertical cross section through the barrel of FIGURE 1.
Figure 3:
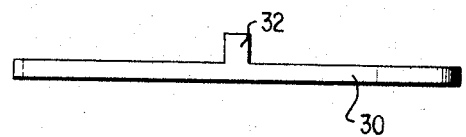
FIGURE 3 is an elevational view of the lower slipring of the device of FIGURE 1.
Figure 4:
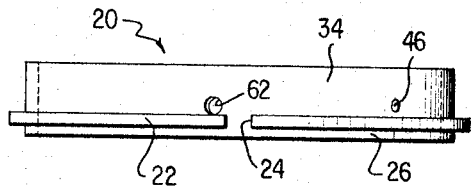
FIGURE 4 is an elevational view of the insulating bushing of the monitor of FIGURE 1.
Figure 5:
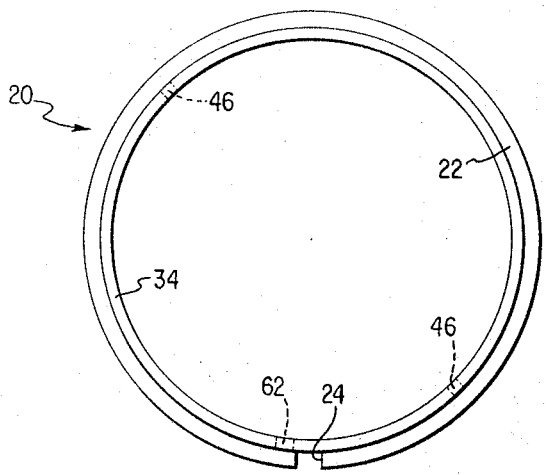
FIGURE 5 is a plan view of the bushing of FIGURE 4.

The operation of the device is illustrated in FIGURES 9 and 10 which are partial bottom plan views of the assembly, the former showing the mainspring completely wound and the latter showing the mainspring run down. In FIGURE 9 tabs 32 and 40 overlie the barrel 12 which receives the conventional mainspring arbor 80 and around which is wrapped the mainspring 82. The inner end of the mainspring 82 is secured to the arbor 80 at 84 in FIGURE 10, whereas the other end of the mainspring 82 is secured to the inner surface of the barrel by a conventional anchor pin 86 in FIGURE 9 passing through anchor pin aperture 87 in the barrel illustrated in FIGURE 2. The position of anchor pin 86 is preferably chosen relative to the location of camming pin 68 in the barrel such that as the mainspring unwinds pin 68 is moved outward in approximately 1 to 1½ turns down of the mainspring. That is, as the barrel 12 rotates the mainspring moves from the position illustrated in FIGURE 9 to that illustrated in FIGURE 10, moving the pin 68 outwardly such that the tab 40 is separated from tab 32, thus breaking the circuit to the light bulb 60 of FIGURE 1 so that the light goes out. The extinguishing of the light indicates that the spring is either unwound or broken since in either case it will assume a position similar to that illustrated in FIGURE 10.

FIGURE 11 shows a modified embodiment usable in arrangements where the mainspring 82 is too light to operate the pin 68. In this embodiment the outer end of the mainspring 82 is connected to the barrel 12 by way of a short section 88 of stronger spring material which section has sufficient strength to actuate the pin 68 when the mainspring 82 of FIGURE 11 expands in the manner illustrated in FIGURE 10.

It is apparent from the above that the present invention provides a novel device for monitoring the condition of a mainspring in a rotatable barrel which barrel may undergo one or more complete revolutions during the time that the mainspring is unwinding. The monitor not only indicates the run-down condition of the mainspring but will also give an indication if the mainspring is broken. Important features of the present invention include the provision of a pair of annular sliprings or contacts both of which are mounted on and rotatable with the barrel but completely insulated therefrom. Each of the sliprings provides a continuous annular surface extending 360° around the barrel so that a continuous contact with brushes or wiper arms is provided at all times during rotation of the barrel. While the device has been illustrated and described in conjunction with breaking the circuit to the light bulb 60 it is apparent that the function of the tabs 40 and 32 may be reversed such that rundown of the spring causes the circuit to the bulb to be completed rather than broken. Similarly, in place of a light bulb any other conventional and well known indicating device capable of electrical energization upon completion of a circuit to it may be utilized in place of the bulb 60.

In one embodiment constructed in accordance with the present invention the mainspring barrel was made of stainless steel and was provided with seventy annular teeth 18. Insulating ring or washer 28 in the embodiment was made of Mylar, lower slipring 30 of hard brass plated wth gold, bushing 20 of epoxy resin, and upper slipring 36 of beryllium copper. The locating pins were made of phenolic resin and the anchor pin 86 for anchoring the outer end of the mainspring to the barrel was made of stainless steel.

While the invention has been described in conjunction with a timer wherein the unit is driven from the barrel in a conventional manner it is understood that the present invention is also applicable to arrangements utilizing the center arbor as the timer drive member. In this case it is the barrel that is wound fully and then locked against rotation, thus causing the center arbor to rotate. The center arbor is provided with a gear pressed onto it and this gear meshes with the gear train, hence driving it. In either case the brushes make wiping engagement with the barrel when it rotates and the device senses expansion of the mainspring.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A monitor for the mainspring of timing devices comprising a rotatable mainspring barrel, an expandable mainspring in said barrel, a pair of electrical contacts mounted on and rotatable with said barrel, an electrical power source and an electrical indicator, a pair of stationary resilient wiper arms engaging said contacts and coupling said electrical power source to said electrical indicator through said contacts, and means radially movable through the wall of said barrel in response to mainspring expansion for separating said contacts.

2. A monitor according to claim 1 wherein said radially movable means comprises a pin having its radially outer end engagable with one of said contacts.

3. A mainspring monitor comprising a mainspring barrel, an insulated bushing around said barrel, a pair of spaced conductive sliprings mounted on said bushing, one of said sliprings having a movable projection engageable with the other slipring, an electrical power source and an electrical indicator, a pair of electrical brushes in wiping engagement with said sliprings, said brushes coupling said power source and indicator in series across said sliprings, and means radially movable through said barrel and acting against said movable projection to produce an indication on said indicator.

4. A monitor according to claim 3 wherein said radially movable means moves said projection away from said other slipring to break the circuit from said power source to said indicator.

5. A monitor according to claim 4 wherein said power source is a battery.

6. A monitor according to claim 4 wherein said indicator is an electric light.

7. A mainspring monitor comprising a mainspring barrel having a plurality of circumferential teeth for driving the gear train of a timing mechanism, an insulated bushing around said barrel, a pair of spaced conductive sliprings mounted on said barrel, one of said sliprings having a resilient tab bearing against the other slipring, an electrical power source and an electrical indicator, a pair of electrical brushes in wiping engagement with said sliprings, said brushes coupling said power source and indicator in series across said sliprings, and a camming pin radially movable through said barrel, the outer end of said pin acting against said resilient tab to move it away from said other slipring.

8. A monitor according to claim 7 wherein said sliprings each have annular portions extending completely around said barrel.

9. A mainspring monitor comprising a mainspring barrel having a plurality of circumferential teeth for driving the gear train of a timer, an arbor passing through said barrel, a coiled mainspring in said barrel, said mainspring having its inner end secured to said arbor and its outer end secured to said barrel, an insulated bushing around said barrel, a pair of spaced conductive sliprings mounted on said barrel, one of said sliprings having a resilient tab bearing against the other slipring, an electrical power source and an electrical indicator, a pair of electrical brushes in wiping engagement with said sliprings, said brushes coupling said power source and indicator in series across said sliprings, said barrel having an aperture adjacent the outer end of said mainspring, and an insulated camming pin slidably received through said aperture, said camming pin having a length greater than the thickness of said barrel wall, the outer end of said camming pin acting to move said resilient tab away from said other slipring when said camming pin is pushed radially outward by the outer winding of said coil.

10. A monitor according to claim 9 wherein said resilient tab engages a tab on said other slipring, and annular flange means spacing said brushes from said tabs.

11. A monitor according to claim 9 wherein said camming pin comprises metallic shank and head portion, said head portion having a cavity, and a ball of insulating material partially received in said cavity.

12. A monitor according to claim 9 including a short section of heavier spring joining the outer end of said mainspring to said barrel.

13. A monitor for the mainspring of timing devices comprising a rotatable mainspring barrel, an expandable mainspring in said barrel, a pair of electrical contacts mounted on and rotatable with said barrel, an electrical power source and an electrical indicator, a pair of stationary resilient wiper arms engaging said contacts and coupling said electrical power source to said electrical indicator through said contacts, at least one of said contacts being movable relative to said barrel to act as a switch for switching said power source to said electrical indicator, and means radially movable through the wall of said barrel in response to mainspring expansion, said radially movable means acting to move said movable contact and thereby actuate said switch when said mainspring expands.

14. A monitor for the mainspring of timing devices comprising a rotatable mainspring barrel, an expandable mainspring in said barrel, a pair of electrical contacts mounted on and rotatable with said barrel, an electrical indicator coupled to said contacts, means radially movable through the wall of said barrel in response to mainspring expansion for separating said contacts, said radially movable means comprising a pin having its radially outer end engageable with one of said contacts, said contacts each having annular portions passing around said barrel, and a pair of stationary electrical brushes in wiping contact with said annular portions and coupling said contacts to opposite sides of said power source.

References Cited by the Examiner

UNITED STATES PATENTS

| | | | |
|---|---|---|---|
| 481,919 | 8/1892 | Sperry | 340—309.2 |
| 776,955 | 12/1904 | Sperling | 58—85 |
| 941,143 | 11/1909 | Hawkins | 58—85 |
| 967,766 | 8/1910 | Hanson | 58—85 |
| 2,214,184 | 9/1940 | Sperry | 185—44 |
| 2,443,558 | 6/1948 | Frennesen | 58—85 X |

FOREIGN PATENTS 36,322    11/1912    Sweden.

NEIL C. READ, *Primary Examiner.*

R. GOLDMAN, D. L. TRAFTON, *Assistant Examiners.*